350-377 SR
XR 3,708,763
TX4030W
X4031T
3708763
OR IN 329/144

United State
Paul

[11] 3,708,763
[45] Jan. 2, 1973

[54] DEVICE FOR TRANSMISSION OF INFORMATION WITH AN INFRARED RADIATION SOURCE

[75] Inventor: Bernt Paul, Erlangen, Germany

[73] Assignee: Siemens Aktiengesellschaft, Berlin and Munich, Germany

[22] Filed: March 15, 1971

[21] Appl. No.: 123,949

[30] Foreign Application Priority Data

March 18, 1970 Germany....................P 20 12 746.2

[52] U.S. Cl...............329/144, 250/83.3 H, 250/199, 307/311, 329/200, 350/151

[51] Int. Cl...............................................G02f 2/00

[58] Field of Search..329/144, 200; 250/199, 83.3 H; 307/311; 350/151; 330/4.9

[56] References Cited

UNITED STATES PATENTS

| | | | |
|---|---|---|---|
| 3,324,295 | 6/1967 | Harris | 250/199 |
| 3,422,269 | 1/1969 | Di Chen | 350/151 UX |
| 3,502,978 | 3/1970 | Bernard et al. | 250/199 UX |

OTHER PUBLICATIONS

Paul et al. "Anisotropic InSb–NiSb as an Infra-red Detector" Solid State Electronics, 1968 Vol. 11, No. 11, pages 979–981.

*Primary Examiner*—Alfred L. Brody
*Attorney*—Curt M. Avery, Arthur E. Wilfond, Herbert L. Lerner and Daniel J. Tick

[57] ABSTRACT

A receiver for an infrared transmission system, particularly for a system in which polarization-modulated radiation is provided with a laser as the radiation source, comprises a magnetic system having at least one pole around which are arranged two pairs of OEN or Ettinghausen-Nernst detectors or PEM or homogenous crystal body detectors including radiation sensitive crystals and respective analyzers. The detectors are arranged with their polarization directions being mutually perpendicular, and the crystals of each pair have a common polarization direction.

13 Claims, 7 Drawing Figures

DEVICE FOR TRANSMISSION OF INFORMATION WITH AN INFRARED RADIATION SOURCE

My invention relates to a device for transmission of information with an infrared radiation source, and in particular, a laser beam source.

In the prior art, infrared transmission systems are generally provided with a powerful radiation source, a modulation means, a transparent transmission medium and an adequately fast receiver for the transmission wavelength which responds to the modulated transmitted signal. It is known that thermal radiators may be used as radiation sources, within the entire infrared range, i.e. within wavelengths of about 0.8 $\mu$m to about 1 mm. However, their spectral radiation intensity is so low even in the $\mu$m range that it cannot be used to provide an economical method of infrared transmission. The monochromatic infrared radiation source developed recently, i.e. the laser and light emitting diodes, have led to infrared transmission systems providing useful results. Transmission systems are known comprising a light emitting gallium-arsenide diode as a source of radiation for a wavelength of 0.9 $\mu$m, and they use a silicon detector as the radiation receiver.

Powerful infrared radiation sources used in continuous operation are the known gas lasers, for example the $CO_2$ laser, which emits at 10.6 $\mu$m. Its radiation power which extends into the kW range may be used as a tool in material processing, due to its capability of being absorbed in non-metals. Furthermore, the $CO_2$ laser may be used as a radiation source for transmission of information, since the atmospheric transmittance at the emission wavelength of the $CO_2$ lasers provides an operational range of up to several hundred km. A problem is to find a suitable combination of a modulation method on the transmitter side coupled with an adequate demodulation on the receiver side. Since the intensity of the laser beam cannot be electronically modulated with satisfactory efficiency and since the frequency of the emitted beam is determined by the energy level which participates in the radiation emission, amplitude and frequency modulation cannot be advantageously employed.

It was recently recognized that polarization modulation is particularly suitable for a laser transmission system, since the $CO_2$ laser, which is equipped with Brewster angle windows, delivers an emitted radiation which is already linearly polarized. In German Pat. No. 1,032,398, a control device for electromagnetic radiation is set forth which, using indium antimonide, is suitable for polarization modulation on the transmitter (sender) side and which is based on the Faraday effect. Suitable for use as detectors for the polarization-modulated radiation on the receiver side, are cooled bolometers with mercury doped germanium, ahead of which are inserted filters or reflection polarizers, acting as analyzers. In this type of analyzer-detector combination, the polarization modulation ahead of the analyzer is converted to an amplitude modulation ahead of the following detector. Hence, the output of the detector on the receiver side delivers a signal, whose amplitude carries the received information.

If the intensity of the beam arriving at the receiver side is additionally modulated, due to noise at the radiation source or in the transmission path, with the above analyzer-detector combination, this noise modulation is superimposed on the output signal unattenuated.

An object of my invention is to provide an improved infrared transmission system.

Another object of this invention is to provide a polarization detector at the receiver side of an infrared transmission system which is relatively insensitive to noise at the transmitter and in the transmission path.

Other objects, advantages and features of this invention will be apparent from the following description.

In accordance with the principles of my invention, the above objects are accomplished by additionally measuring the amplitude of the incoming radiation and forming the ratio of the amplitude of the output signal of the receiver to the amplitude of the incident radiation.

According to an earlier German patent application, Ser. No.P 19 51 920.0–51, filed Oct. 13, 1969, a device for determining the plane of oscillation of a polarized light beam is provided by reflecting the beam at an analyzer surface, in the form of a pyramid with a square base and having an axis parallel to the direction of the radiation and whose apex is facing the radiation. The reflecting lateral surfaces of the pyramid preferably consist of silicon or germanium. In the path of the rays which are reflected by the lateral faces of the pyramid, are situated photoelectronic elements which are connected so that the plane of oscillation of the radiation may be determined from the difference of the reflected rays.

My invention thus rests on the recognition that this approach can also be used to advantage for a receiver of an infrared transmitting system, with polarization-modulated radiation. According to this invention, at least two PEM or homogenous crystal body detectors or OEN or Ettinghausen-Nernst detectors are provided to which are assigned mutually perpendicular polarization directions. Their radiation-sensitive crystals are arranged around a common inner pole of a magnet system. The respective crystals of pairs of detectors situated opposite each other have a common polarization direction and have at least one associated analyzer. The individual crystals are arranged in a leg of a bridge circuit connection, along whose one diagonal, half the difference of the no-load voltage sum, produced by oppositely situated detector pairs, may be derived as a signal voltage, the magnitude of which depends on the polarization, and along the other diagonal thereof, half the sum of all no-load voltages of the individual detectors is produced as a polarization-independent reference voltage. In such a device having four detectors, both pairs of detectors are assigned two mutually perpendicular polarization directions.

OEN detectors are known. They contain a radiation detector which is situated in a magnetic field and whose crystalline semiconductor body, according to German Pat. No. 1,214,807, contains regions of better electroconductivity which are formed of a second crystalline phase aligned perpendicularly to the direction of the generated current. The operation of such detectors is based on an optically induced Ettinghausen-Nernst effect. The art therefore uses the name OEN detector. The semiconductor used in the OEN detector comprises an $A_{III}B_V$ compound, particularly indium antimonide InSb, and the embedded inclusions may consist of nickel antimonide NiSb, or other crystalline materials.

The optical absorption is determined in this material at wavelengths below the indium-antimonide absorption limit, i.e. at room temperatures it is below 7 $\mu$m, and it is determined essentially through the intrinsic conductivity excitation of the indium antimonide. The inclusions of the second phase supply the dominant absorption component, above the absorption limit. The detector may, therefore, also be used for rays with a wavelength above 7 $\mu$m, as known from "Anisotropy InSb-NiSb as an Infrared Detector" appearing in "Solid State Electronics", 1968, Vol. 11, pages 979 to 981. The detector does not depend on the polarization of the infrared radiation when the inclusions are in the form of needles, perpendicular to the irradiated crystal surface. The simultaneous influence of a, preferably, homogenous magnetic field and of a thermal flux produced in the crystal perpendicularly to the magnetic field, produces an electrical voltage perpendicular to these indicated directions. The heat flux occurs as a result of the temperature gradient, which is produced by the absorbed infrared radiation, i.e. by optical means. Such OEN detectors have a low time constant.

For radiation with a wavelength up to about 7 $\mu$m, the known PEM detectors with homogenous crystal bodies may also be used.

The information transmission system according to the invention has a high sensitivity in the wavelength range of approximately 1.7 $\mu$m to the range of mm and its time constant is about $10^{-4}$ sec, above approximately 7 $\mu$m.

The invention will be more fully described by way of example with reference to the accompanying drawings illustrating a preferred embodiment of the apparatus according to the invention.

Figures 1, 2, 3, 4, 5:
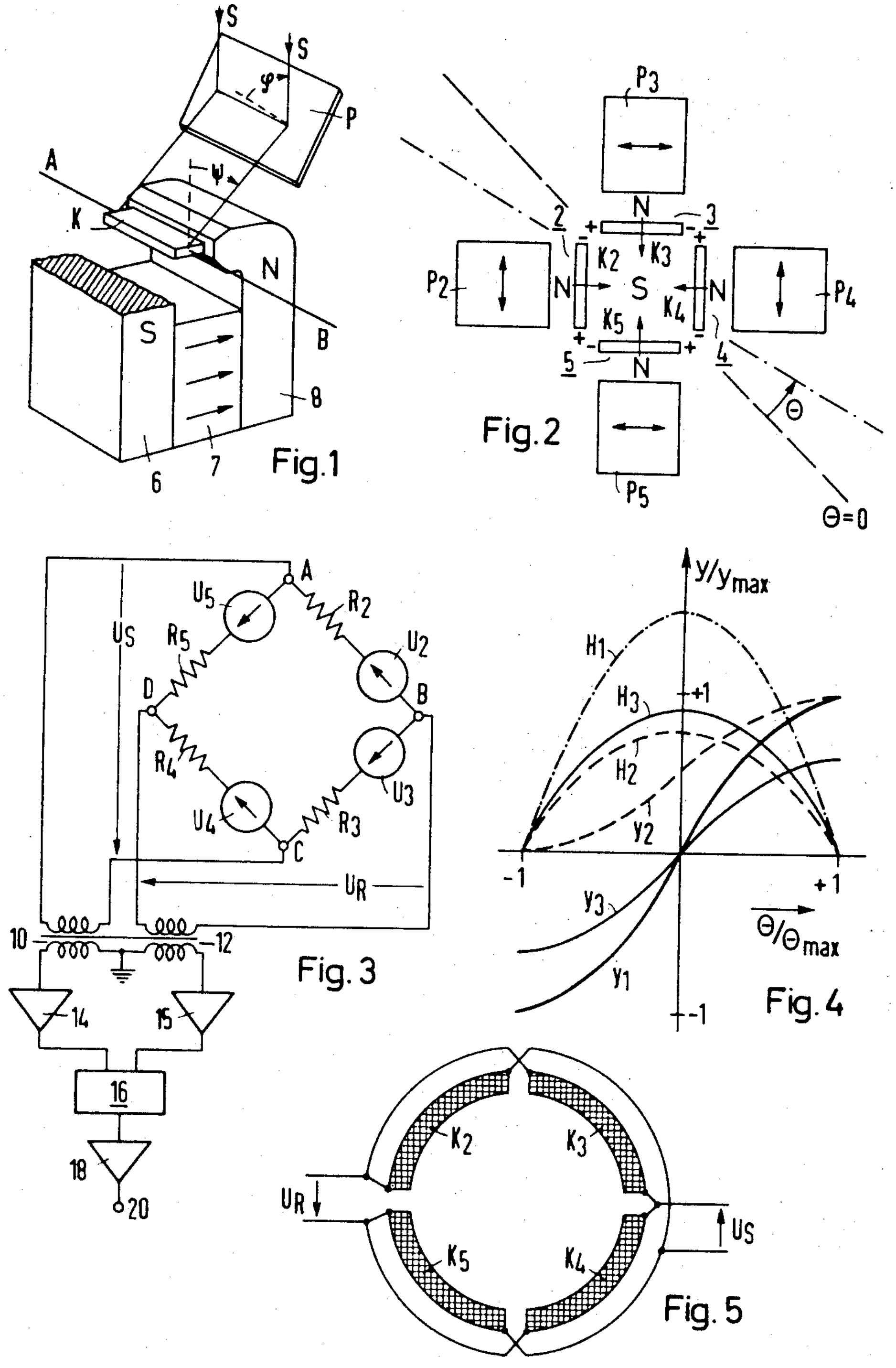
FIG. 1 is a perspective view of an embodiment of a device according to my invention, having a single detector and a planar reflection surface.
FIG. 2 shows another embodiment of the invention having a plurality of reflection surfaces, with which is associated a detector crystal, respectively.
FIG. 3 is a schematic diagram representing the electrical configuration formed by the embodiment of FIG. 2.
FIG. 4 is a graph illustrating the mode of operation of the device according to the invention.
FIG. 5 is a top view of one arrangement of the semiconductor bodies of the detectors.

In FIG. 1, a crystalline semiconductor body K of an OEN or Ettinghausen-Nernst detector functioning as a radiation receiver, is between a South pole S and a North pole N of a magnet 7, for example a permanent magnet, and, in particular, between the pole pieces 6 and 8. The incident electromagnetic radiation, as indicated by the double arrow, preferably an infrared beam, particularly a laser beam, enters at an angle of incidence $\phi$ , upon the reflecting surface of a reflection polarizer P. The beam reflected by the polarizer P impinges at an angle of incidence $\psi$ upon the receiver surface K of the detector crystal whose ends are provided with electrical terminals A and B. If the angle of incidence $\phi$ of the radiation which is reflected at the polarization plate P is equal to polarization angle $\phi_P$ of the plate with the index of refraction $n$, whereby $$\tan \phi_P = n$$

then, as well known, only the component of the incident radiation which oscillates perpendicularly relative to the plane of incidence is reflected, and the radiation which arrives at the detector crystal K is completely polarized. If the radiation impinging upon the polarizer P is polarization-modulated, then the polarizer P will act as analyzer. The radiation arriving at crystal K then contains only the component which oscillates at right angles to the plane of incidence on the polarizer P and carries the modulation of this component as amplitude modulation.

The detector crystal K then delivers a signal voltage which consists of a d.c. component and of the superimposed modulation at its output terminals A and B. Since the plane of incidence on the crystal K is identical with that on the polarizer P, the perpendicularly oscillating component is also more strongly reflected at the crystal K. The output is determined by the reflectivity $R(\phi)$ of the polarizer P for the angle $\phi$ and by the surface transmittance $1 - R(\psi)$ of the crystal K, for the angle $\psi$ . The reflection coefficients of the crystal are therefore kept low, preferably by improving the surface characteristics. Moreover, the entire detector may be so rotated, relative to the polarizer P, that the angle of incidence becomes $\psi = 0$.

According to FIG. 2, four such OEN or Ettinghausen-Nernst detectors 2 to 5 are provided and are supplied by a common magnetic system having an inner pole S, said system not being shown. Then, upon irradiation as described above, voltages are produced in crystals $K_2$ to $K_5$, with polarities indicated at the individual crystals. When each crystal is illuminated by an associated reflection polarizer $P_2$ to $P_5$, then two respective, oppositely positioned crystals $K_2$ and $K_4$, and $K_3$ and $K_5$, respectively, respond to a common polarization direction, namely that polarization direction whose electric vector oscillates parallel to the longitudinal direction of the crystal. This direction is shown as a double arrow, at the polarization plates $P_2$ to $P_5$, whose reflection surfaces are inclined with respect to the plane of the drawing.

The operation of the four crystals $K_2$ to $K_5$ can be represented by a respective no-load voltage source $U_2$ to $U_5$ and a respective internal resistance $R_2$ to $R_5$. The series circuit connection of these voltage sources with the associated inner resistances may be shown combined to form a bridge, according to FIG. 3. In the arrangement with four detectors 2 to 5 and one of the associated polarizers $P_2$ to $P_5$, one voltage source, respectively, is arranged, according to FIG. 3, in series with the associated internal resistance, in a leg of a bridge circuit, whereby a reference voltage $U_R$ appears across one of its diagonals, while the modulation-polarized signal voltage $U_S$ appears across the other diagonal. In the special case where the individual resistances $R_2$ to $R_5$ are equal, the following reference voltage is produced:

$$U_R = \tfrac{1}{2} (U_3 + U_5 + U_2 + U_4)$$

and the signal voltage is:

$$U_S = \frac{1}{2}\,(U_3 + U_5 - U_2 - (U_4)$$

Thus, the signal voltage constitutes one half of the difference of the no-load voltage sums produced by the two oppositely positioned pairs of detectors, while the reference voltage $U_R$ constitutes half the sum of all the no-load voltages. But, since both detector pairs $K_2$ and $K_4$ and $K_3$ and $K_5$ respond to polarization directions perpendicular with respect to each other, the signal voltage $U_S$ depends on the polarization direction and on the intensity or power of the impinging total radiation, while the reference voltage depends only on the intensity.

Therefore, the quotient $$y = \frac{U_S}{U_R} = \frac{1 - \dfrac{U_2 + U_4}{U_3 + U_5}}{1 + \dfrac{U_2 + U_4}{U_3 + U_5}} = \frac{1-x}{1+x}$$

now depends only on the ratio:

$x = (U_2 + U_4/U_3 + U_5)$ of the voltage sums produced by the two detector pairs.

An amplitude modulation of the radiation impinging upon the entire device, according to FIG. 2, influences the four voltages $U_2$ to $U_5$, by the same factor. This makes $x$ and thus also $U_S/U_R = y$, independent of the amplitude. The reference voltage $U_R$ and the signal voltage $U_S$ may be preferably supplied to one of the voltage transformers 10 or 12, one end of whose secondary windings is connected together and to ground. The other ends of the secondaries are connected, via amplifiers 14 and 15, respectively, to the input of a device 16 which forms the quotient and produces the quotient $U_S/U_R$ which may be supplied, if necessary, via another amplifier 18, to an output terminal 20.

As a measure for the effectiveness of the device with four detectors, a modulation transmission function H ($\theta$) may be formed, as illustrated in the curves of FIG. 4, where $\theta$ is the azimuth of the polarization plane of the polarization-modulated beam:

$$H(\theta) = \theta_{max}/y_{max} \cdot dy/d\theta.$$

Therefore, $H(\theta)$ is the rate at which the slope of the output magnitude $y$ changes in dependence on the modulated azimuth $\theta$. In the diagram according to FIG. 4, $y$ and $\theta$ are plotted in units of their attainable maximum values. $\theta = 0$ indicates the polarization direction at which the electrical vector is to be rotated by 45°, relative to the plane of incidence of polarizers $K_2$, $K_3$, $K_4$ and $K_5$, as shown in dashed lines in FIG. 2. The maximum useful modulation range extends from $\theta] = -\pi/4$ to $\theta = +\pi/4$ with $\theta_{max} = \pi/4$. The respective maximum values for y are then $y = 1$ which corresponds to $\theta = -\pi/4$ and $y = +1$, which corresponds to $\theta = +\pi/4$. In the center position, $y = 0$ and $\theta = 0$. Hence, for the four-component polarization detector according to FIG. 2, with the present reference for the zero point, the function $H(\theta)$ is determined as:

$$H(\theta) = \pi/4 \cdot dy/d\theta$$

Since each polarizer eliminates the electrical component in the oscillation direction which is to be blocked while, in the direction perpendicular thereto, the electrical component is transmitted by an attenuation factor which is independent of the blocked component, the polarizer of the invention has a sin $\theta$ characteristic, with respect to the amplitude, but a $\sin^2\theta$ characteristic, with respect to the power. Hence, for a polarization detector of my invention with four detectors, according to FIG. 2, the following curve is obtained:

$$y_1 = \sin 2\theta$$

as shown in FIG. 4 by the solid curve. For the H function, $H_1(\theta) = \pi/2 \cdot \cos 2\theta$, the curve of which is illustrated by dash-dotted lines in FIG. 4.

A single polarization detector according to the arrangement of FIG. 1 provides, on the other hand, an azimuth dependence for the output signal, whose curve $y_2$ and $H_2$ is shown in FIG. 4 by dotted lines. The curve for $y_2$ does not pass the zero point.

The greatest modulation dependence, represented by the maximum of the $H_1$ function in FIG. 4, is attained in the four-part detector, during the zero passage of the output magnitude $y_1$. The antisymmetrical curve of the output magnitude $y_1$ effects a doubling of the normalized rate of change of the slope, which may be recognized in FIG. 4 by the double magnitude of the $H_1$ function, relative to $H_2$, according to an arrangement having a single detector.

The four-detector device comprising four single polarizers may be further improved according to a preferred embodiment of the invention, by constructing the crystal bodies $K_2$ to $K_5$ as arcs of an annular ring, whose placement and circuit connection are schematically illustrated in FIG. 5. The ends of the crystal bodies are so interconnected that their electrical arrangement results in a bridge circuit according to FIG. 3. The reference voltage $U_R$ is provided across the connecting conductors of the crystal bodies $K_2$ and $K_3$, and $K_4$ and $K_5$. The polarized signal voltage $U_S$ is obtained between the connecting leads of crystal bodies $K_3$ and $K_4$, as well as $K_2$ and $K_5$.

The polarizers are then preferably also of the type with a curved reflection surface, the reflected rays from which are guided upon the surface of the crystal bodies $K_2$ to $K_5$, where they form a "focal circle" in the shape of a circular disc or ring. Such polarizers are suited for the sensing of a beam of rays.

A considerable simplification of the device according to my invention is obtained by providing the radiation receivers according to FIG. 5 with a common polarizer which may be designed in form of a cup whose inside surface forms the reflector. The total reflector surface may then be shaped, for example, as a many-sided, truncated pyramid, containing a large number of trapezoidal individual faces, and whose open base is entered by the radiation. A truncated cone, for example, is also feasible as the reflecting surface. The reflected rays then form on the surface of the crystal bodies $K_2$ to $K_5$ an annular disc, which functions as an effective absorption surface.

Figure 6:
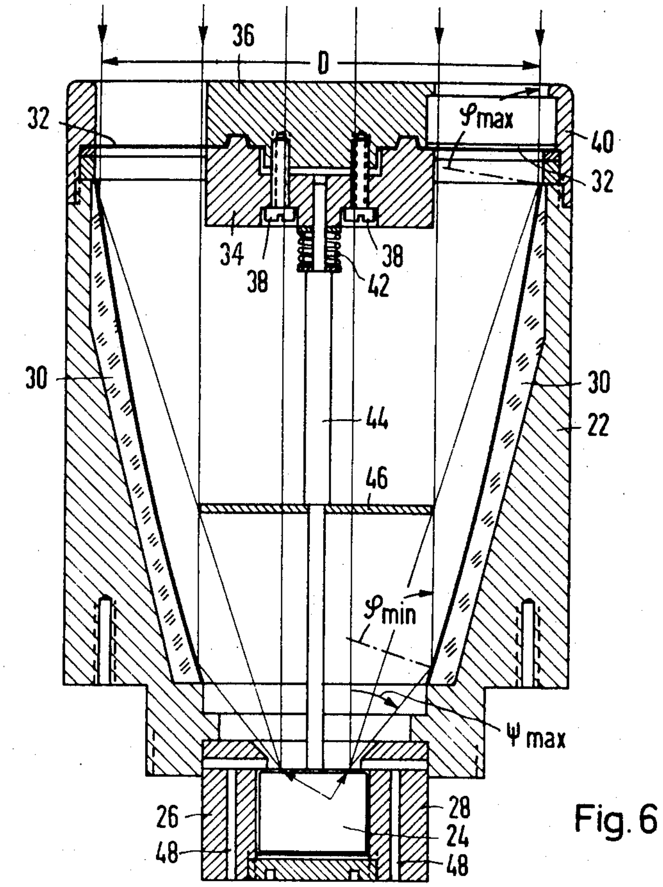
FIG. 6 is a side-sectional view of an embodiment of a receiver of this invention.

Most preferable is the design of a reflector as an off-axis rotation paraboloid according to FIG. 6. The generatrix of the rotation paraboloid is a parabola whose focal point is situated on the detector-crystal ring and whose axis is parallel to the axis of rotation which passes through the center of the ring. The axis of rotation, being the axis of the cup-shaped analyzer, is also the optical axis. The inside surface of the cup 22 then defines a rotation paraboloid, whose axis of rotation runs in the direction of the beam to be received. The geometrical locus of the focal points of the reflector defines a focal circle on the surface of the annular segments that are situated between the pole pieces of a ring-slot magnet 24 which is situated below the rotation paraboloid. A loudspeaker-cup-shaped magnet may be provided, for example, as the ring-slot magnet 24. This type of analyzer will provide a curve for the modulation-transmission function which is shown as a solid line in FIG. 4, as $y_3$, respectively $H_3$. Although this embodiment produces a somewhat weaker output signal, it offers the advantage that the curved reflection surface may at the same time function as the objective of the analyzer. Furthermore, the design of such an arrangement which comprises a housing 22, a ring-slot magnet 24 and pole pieces 26 and 28, and is affixed to the bottom of the housing 22, is appropriately simple. The beam which enters from above upon the rotation-symmetrical polarization detector, parallel to the axis, as shown by arrows, is focussed by the off-axis rotation paraboloid upon the crystal which is divided into four sectors of equal size. This circle, thus, constitutes at the same time the focal line of the paraboloid.

The ring-slot magnet 24 produces a radial magnetic field, which permeates the individual semiconductor bodies, not shown in FIG. 6. The reflector 30 consists of a highly refractive, but weakly absorbing material, such as, for example, germanium or silicon. The reflector 30 may be cast, for instance, of plastic over a negative pattern, whereby the germanium or, if necessary, also the silicon powder, is embedded into the casting mass and, subsequently, the surface coating 30 is produced through vapor deposition with germanium or silicon, respectively. This coating 30 of the reflector prevents reflection of the radiation component which oscillates parallel to the plane of incidence.

As a protection against dust and convection, it is advantageous to also provide a window 32 shaped as a circular disc and consisting, for example, of a film of plastic. The window 32 is fastened between parts 34 and 36 of a cover via screws 38, for example, and its outer rim is clamped, air-tight, by means of a threaded cap 40 of the plastic housing. The head portion 36 is spring-loaded by a spring 42 and by a holder 44. The holder 44 also supports a light baffle 46. The rays reflected by the reflection body 30 form a focal circle indicated by arrows in the FIG. on the surface of the crystal bodies, within the air gap of the ring magnet 24. Holes 48 may be provided for the electrical connecting conductors of the individual crystal bodies.

Figure 7:
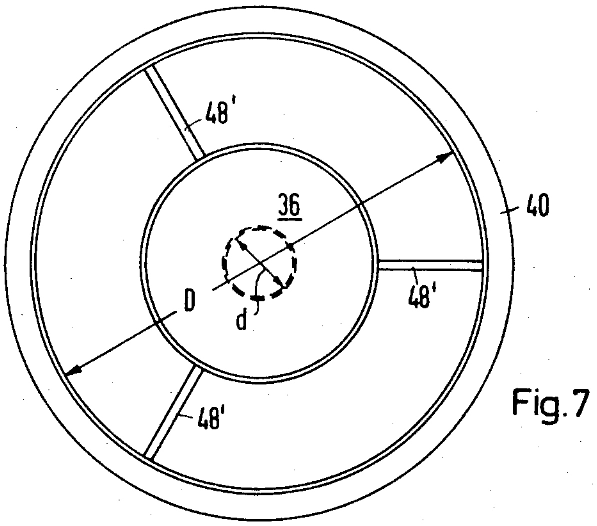
FIG. 7 is a top view of the receiver of FIG. 6 with the detector arrangement of FIG. 5.

According to a top view illustrated in FIG. 7, the threaded cap 40 is used to fasten the protective foil 32 and defines the boundary of the housing 22. The head portion 36 which is supported by three straps 48', is visible in the center of the arrangement.

The off-axis rotation paraboloid 30 which functions, simultaneously, as an objective and as an analyzer, is dimensioned so that all rays which enter parallel to the axis, through the window 32, impinge upon the surface of the reflector 30 at an angle of incidence $\phi$, close to the angle of polarization $\phi_P$, and impinge upon the detector, situated in the focal circle, at an angle of incidence $\psi$, which is not too large. The critical values of the indicated angles for a germanium analyzer, with polarization angle $\phi_p = 75° 58'$, are preferably selected as:

$$\phi_{max}\ 81°$$

$$\phi_{min}\ 70°$$

$$\psi_{max}\ 40°$$

The focal circle diameter $d$, according to FIG. 7, is determined by the dimensions of the selected ring-slot magnet 24. The outside diameter D of the reflector may be freely chosen.

The embodiment according to FIG. 2 selects an arrangement with four detectors, two of which are associated to polarization directions which run perpendicularly to one another. A simpler embodiment may be obtained with two detectors associated with polarization directions which run perpendicularly to each other. The crystal bodies of these detectors should be placed in two adjacent bridge legs, according to FIG. 3, and the remaining bridge legs are each provided with a fixed resistance. This arrangement requires only a small expenditure, but its sensitivity is also less.

For receiving a beam of relatively large diameter, which amounts, for example, to several meters, the analyzer according to FIG. 6 may also be provided with a telescopic system which is not shown in the FIG., more particularly with a reflecting telescope, attached in front of said analyzer.

While the invention has been described by means of specific examples and in a specific embodiment, I do not wish to be limited thereto, for obvious modifications will occur to those skilled in the art without departing from the spirit and scope of the invention.

I claim:

1. A receiver for an infrared transmission system having an infrared radiation source, such as a laser source, whose radiation is polarization modulated, said receiver comprising a magnetic system having a magnetic pole, an analyzer for polarizing radiation, and at least two detectors coupled to the analyzer, each of said detectors comprising radiationsensitive crystals and having polarization directions perpendicular to each other, said crystals being arranged around said magnetic pole.

2. A receiver according to claim 1, comprising two pairs of detectors arranged around said magnetic pole, each detector of each pair being positioned opposite the other detector of each pair, said pairs of detectors having mutually perpendicular polarization directions, said radiation-sensitive crystals of one of said pairs of detectors having a common polarization direction and said radiation-sensitive crystals of the other of said pairs of detectors having a common polarization direction perpendicular to the common polarization direction of said one pair of radiation sensitive crystals.

3. A receiver according to claim 2, wherein said detectors comprise an Ettinghausen-Nernst detector.

4. A receiver according to claim 2, wherein said detectors comprise a homogenous crystal body detector.

5. A receiver according to claim 2, wherein said crystals are interconnected to form the ratio of the amplitude of the radiation to the output of said receiver.

6. Device according to claim 5, whereby said crystals form legs of a bridge connection having two diagonals, the half sum of all no-load voltages of the detectors being formed across one of said two diagonals and constituting a reference voltage, while at its other diagonal the half difference of the no-load voltages produced by the oppositely positioned detector pairs is formed across the other diagonal of said bridge and constitutes a polarization-modulated signal voltage.

7. A receiver according to claim 2, comprising an arcuate member, wherein said crystals form equal arc segments regularly spaced along the circumference of said arcuate member and each of said analyzers associated with said crystals is of a curved surface configuration conforming to the shape of said crystals.

8. A receiver according to claim 7, whereby said analyzers are formed as sections of a common, off-axis rotation paraboloid.

9. A receiver according to claim 8, comprising a ring-slot magnet having an air gap and an axis, said axis of said ring-slot magnet being parallel to the rotation axis of the rotation paraboloid, and said crystals of the detectors being located within the air gap of said ring-slot magnet.

10. A receiver according to claim 9, wherein the crystals of the detectors include a common pot reflector having a reflecting surface, said reflecting surface being shaped as an off-axis symmetrical-rotation paraboloid.

11. A receiver according to claim 1, wherein said analyzer is a polarizer having a surface,said surface of said polarizer being vapor-deposited with germanium.

12. A receiver according to claim 11, whereby the semiconductor bodies consist of indium-antimonide and the inclusions are nickel-antimonide.

13. A receiver according to claim 1, wherein said detectors are Ettinghausen-Nernst detectors and comprise a semiconductor body of an $A_{III}B_V$ compound, and said crystals include parallel inclusions of a second crystalline phase of better electroconducting material.

* * * * *